United States Patent
Chu et al.

(10) Patent No.: US 10,207,956 B2
(45) Date of Patent: Feb. 19, 2019

(54) METHODS OF FORMING SILICON CARBIDE BY SPARK PLASMA SINTERING

(71) Applicant: BATTELLE ENERGY ALLIANCE, LLC, Idaho Falls, ID (US)

(72) Inventors: Henry S Chu, Idaho Falls, ID (US); Robert C O'Brien, Idaho Falls, ID (US); Steven K Cook, Idaho Falls, ID (US); Michael P Bakas, Raleigh, NC (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 145 days.

(21) Appl. No.: 15/195,313

(22) Filed: Jun. 28, 2016

(65) Prior Publication Data

US 2017/0369381 A1    Dec. 28, 2017

(51) Int. Cl.
*C04B 35/575*  (2006.01)

(52) U.S. Cl.
CPC .... *C04B 35/575* (2013.01); *C04B 2235/6562* (2013.01); *C04B 2235/6565* (2013.01); *C04B 2235/6567* (2013.01); *C04B 2235/666* (2013.01); *C04B 2235/767* (2013.01); *C04B 2235/77* (2013.01)

(58) Field of Classification Search
None
See application file for complete search history.

(56) References Cited

U.S. PATENT DOCUMENTS

| | | | |
|---|---|---|---|
| 3,241,956 A | 3/1966 | Inoue |
| 3,317,705 A | 5/1967 | Inoue |
| 5,354,536 A | 10/1994 | Ezis |
| 7,029,613 B2 | 4/2006 | Wan et al. |
| 7,077,991 B2 | 7/2006 | Wan et al. |
| 7,557,054 B2 | 7/2009 | Oda et al. |
| 7,833,922 B2 | 11/2010 | Bakas et al. |
| 7,879,284 B2 | 2/2011 | Martins Loureiro et al. |
| 8,381,632 B1 | 2/2013 | Chu et al. |
| 8,573,571 B2 | 11/2013 | Langhorst et al. |
| 2013/0085055 A1 | 4/2013 | Raj et al. |

(Continued)

FOREIGN PATENT DOCUMENTS

| | | |
|---|---|---|
| DE | 102013006118 B3 | 4/2014 |
| JP | 4854482 B2 | 11/2011 |

OTHER PUBLICATIONS

Gephart et al., Field Assisted Sintering of SiC Using Extreme Heating Rates, J. Mater. Sci. vol. 46, (2011), pp. 3659-3663.

(Continued)

*Primary Examiner* — Guinever S Gregorio
(74) *Attorney, Agent, or Firm* — TraskBritt

(57) ABSTRACT

A method of forming silicon carbide by spark plasma sintering comprises loading a powder comprising silicon carbide into a die and exposing the powder to a pulsed current to heat the powder at a rate of between about 50° C./min and about 200° C./min to a peak temperature while applying a pressure to the powder. The powder is exposed to the peak temperature for between about 30 seconds and about 5 minutes to form a sintered silicon carbide material and the sintered silicon carbide material is cooled. Related structures and methods are disclosed.

18 Claims, 6 Drawing Sheets

(56) References Cited

U.S. PATENT DOCUMENTS

2014/0306381 A1* 10/2014 Raj ................. C04B 35/016
264/414
2018/0208511 A1* 7/2018 Liang ................. C04B 35/528

OTHER PUBLICATIONS

Grasso et al., Effects of Initial Punch-Die Clearance in Spark Plasma Sintering Process, Materials Transactions, vol. 49, No. 12, (2008). pp. 2899-2906.
Grasso et al., Flash Spark Plasma Sintering (FSPS) of x and β-SiC, J. Am. Ceram. Soc., vol. 99, No. 5, (2016), pp. 1535-1543.
Munir et al., Electric Current Activation of Sintering: A Review of the Pulsed Electric Current Sintering Process, J. Am. Ceram. Soc., vol. 94, No. 1, (2011), pp. 1-19.
Suarez et al., Challenges and Opportunities for Spark Plasma Sintering: A Key Technoloy for a New Generational of Materials, Intech, Sintering Applications, Chapter 13, (2013), pp. 319-342.

* cited by examiner

METHODS OF FORMING SILICON CARBIDE BY SPARK PLASMA SINTERING

STATEMENT REGARDING FEDERALLY SPONSORED RESEARCH OR DEVELOPMENT

This invention was made with government support under Contract Number DE-AC07-05-ID14517 awarded by the United States Department of Energy. The government has certain rights in the invention.

FIELD

Embodiments of the disclosure relate generally to sintered silicon carbide structures and articles, and methods of forming such structures and articles. More particularly, embodiments of the disclosure relate to sintered silicon carbide structures and articles exhibiting a theoretical density of about 100 percent, and to related methods of forming the sintered silicon carbide structures and articles by spark plasma sintering.

BACKGROUND

Silicon carbide materials are useful in many applications, including, for example, armor, solid state semiconductor materials, and various nuclear applications. Silicon carbide materials with a high theoretical density may exhibit a high hardness and are, therefore, suitable in applications such as, for example, military grade body armor or in armored vehicles. However, silicon carbide is a difficult material to sinter and, therefore, fabrication of materials including silicon carbide is difficult. In addition, silicon carbide structures having nonconventional geometries are difficult to fabricate.

Spark plasma sintering (SPS) is a method of sintering a powdered material by directing electric current in pulses to a powder loaded in a die. Small scale spark plasma sintering of silicon carbide conventionally uses sintering aids and other additives to facilitate sintering of the silicon carbide material. However, as the size of the structure to be sintered increases, it is increasingly difficult to form the silicon carbide structure to near full theoretical density by spark plasma sintering. For example, as the size of the structure increases, it is difficult to uniformly distribute heat to the powder loaded in the compacted die of the spark plasma sintering tool. Accordingly, the sintered silicon carbide structure may exhibit nonuniform properties (e.g., hardness and density) across a cross-section thereof.

Conventional methods of fabricating silicon carbide structures (e.g., silicon carbide tiles) used for armor and related applications include liquid phase sintering, solid state sintering, hot isostatic or axial pressure sintering, pressureless sintering, or other sintering methods. Such methods are time consuming, consume more power than spark plasma sintering, and are expensive. In addition, sintering silicon carbide using such techniques often uses excessive amounts of sintering aids to enhance diffusion and sintering. For example, structures formed by solid state sintering or liquid phase sintering may include between about 0.5 weight percent and about 3.0 weight percent or between about 5 weight percent and about 15 weight percent of sintering aids, respectively. However, such sintering aids may reduce one or more of a purity, a density, a hardness, or a strength of the sintered structure.

BRIEF SUMMARY

Embodiments disclosed herein include methods of forming sintered silicon carbide structures by spark plasma sintering, as well as related sintered silicon carbide structures. For example, in accordance with one embodiment, a method of forming silicon carbide by spark plasma sintering comprises loading a powder comprising silicon carbide into a die, exposing the powder to a pulsed current to heat the powder at a rate of between about 50° C./min and about 200° C./min to a peak temperature while applying a pressure to the powder, exposing the powder to the peak temperature for between about 30 seconds and about 5 minutes to form a sintered silicon carbide structure, and cooling the sintered silicon carbide structure.

In additional embodiments, a method of forming an article including silicon carbide by spark plasma sintering comprises providing a powder comprising silicon carbide into a die, pulsing a direct current through the powder in the die at a current density less than about 0.1 A/mm$^2$ to heat the powder to a peak temperature of at least about 1,950° C. and form a sintered silicon carbide structure, exposing the sintered silicon carbide structure to a current density of between about 0.02 A/mm$^2$ and about 0.08 A/mm$^2$ while exposing the sintered silicon carbide structure to the peak temperature, and cooling the sintered silicon carbide structure.

In further embodiments, a sintered silicon carbide article comprises a silicon carbide material comprising silicon alpha-phase silicon carbide having a density of at least about 3.146 g/cm$^3$, wherein the article has a thickness to diameter ratio greater than about 1:2.

DETAILED DESCRIPTION

Figure 1:
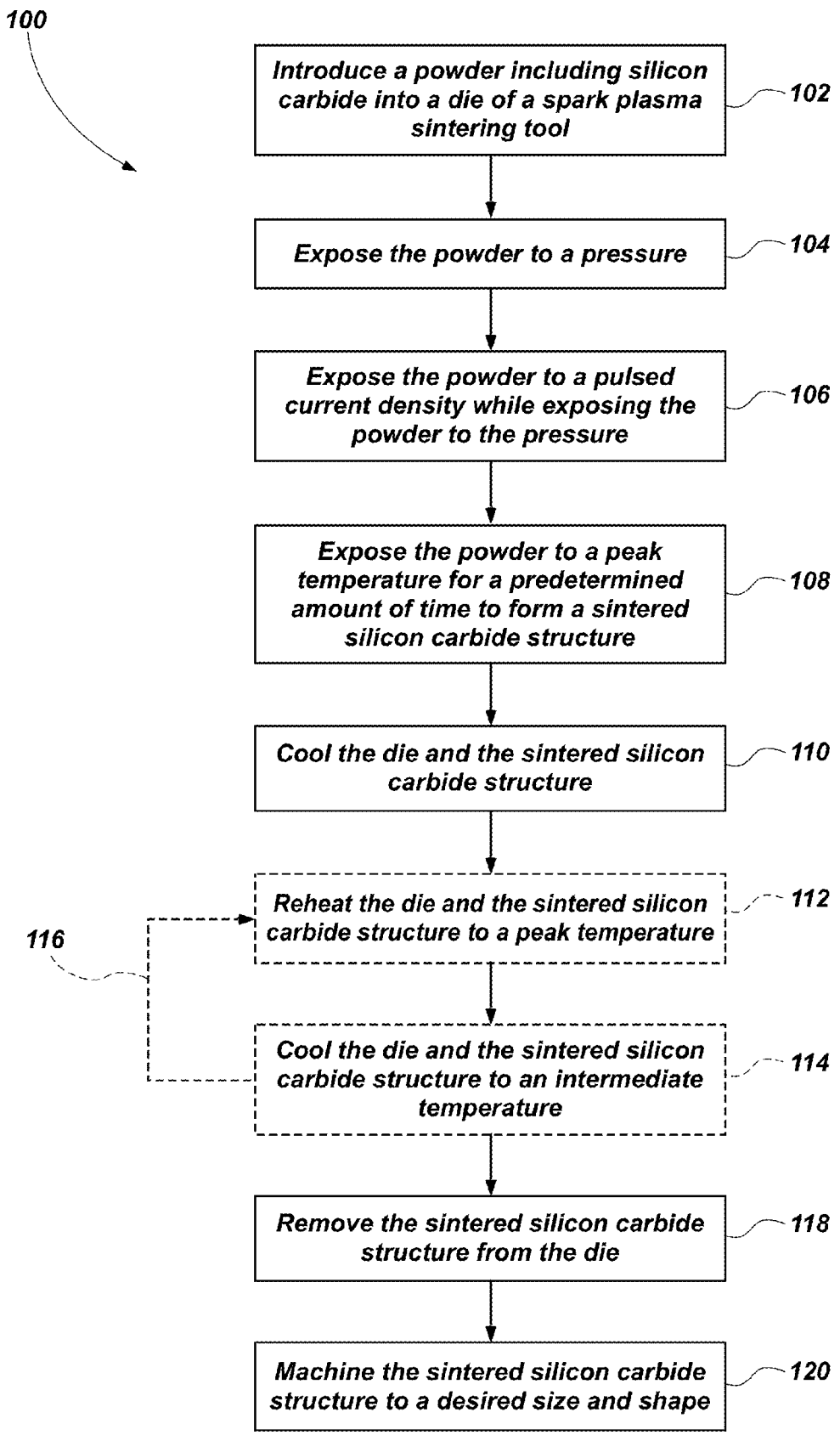
FIG. 1 is a simplified flow diagram of a method of forming a sintered silicon carbide structure, in accordance with embodiments of the disclosure.

Illustrations presented herein are not meant to be actual views of any particular material, component, or system, but are merely idealized representations that are employed to describe embodiments of the disclosure.

The following description provides specific details, such as material types, dimensions, and processing conditions in order to provide a thorough description of embodiments of the disclosure. However, a person of ordinary skill in the art will understand that the embodiments of the disclosure may be practiced without employing these specific details. Indeed, the embodiments of the disclosure may be practiced in conjunction with conventional fabrication techniques employed in the industry. In addition, the description provided below does not form a complete process flow, apparatus, or system for forming sintered silicon carbide structures by spark plasma sintering or related sintered silicon carbide structures. Only those process acts and structures necessary to understand the embodiments of the disclosure are described in detail below. Additional acts to form sintered silicon carbide structures exhibiting a high theoretical density may be performed by conventional techniques. Also note, any drawings accompanying the present application are for illustrative purposes only, and are thus not drawn to scale. Additionally, elements common between figures may retain the same numerical designation As used herein, the term "spark plasma sintering" means and includes a method of sintering a powdered material by Joule heating responsive to exposure to a pulsed electric current. The term spark plasma sintering is used interchangeably herein and in the art with terms such as "pulsed electric current sintering" (PECS), "field-activated sintering technique" (FAST), and "direct current sintering" (DCS).

Spark plasma sintering (SPS) may be used to form silicon carbide (SiC) structures used for armor, in solid-state switches, in nuclear applications, or in other structures in which a full density silicon carbide material is desired. According to embodiments described herein, silicon carbide structures may be fabricated by spark plasma sintering. The silicon carbide structures formed according to embodiments described herein may have a size larger than those formed by methods of the prior art and may exhibit a theoretical density as high as about 98%, about 99%, or even about 100%. The silicon carbide structures may exhibit a Vickers hardness greater than a Vickers hardness of silicon carbide structures formed by other methods, such as by pressing in a hot axial press, pressureless sintering, liquid phase sintering, or solid-state sintering. In addition, silicon carbide structures formed according to embodiments described herein may exhibit shapes configured to conform to a surface or an area to be covered with the silicon carbide structures (e.g., military personnel or military vehicles).

In some embodiments, a powder comprising or consisting essentially of silicon carbide is disposed in a die of a spark plasma sintering tool. A pulsed electric current is applied to the silicon carbide powder through the die while the powder is exposed to a pressure. A current density to which the silicon carbide powder is exposed may be controlled to control the temperature of the die. The silicon carbide powder may be exposed to a first current density while the silicon carbide powder is heated to a peak temperature and to a second current density after the silicon carbide powder has reached the peak temperature. The silicon carbide powder may be exposed to the peak temperature for a predetermined duration to sinter the silicon carbide powder and form a sintered silicon carbide structure. The sintered silicon carbide structure may be cooled to an intermediate temperature after exposure to the peak temperature. After the sintered silicon carbide structure is cooled to the intermediate temperature, the sintered silicon carbide material may be exposed to another peak temperature and subsequently allowed to cool. Exposing the sintered silicon carbide material to another peak temperature may enhance densification of the sintered silicon carbide material. A total current density to which the silicon carbide powder is exposed during the spark plasma sintering process may be controlled to form a sintered silicon carbide structure exhibiting desired properties and substantially reduce formation of elemental silicon and elemental carbon in the sintered silicon carbide structure.

Referring to FIG. 1, a simplified flow diagram illustrating a method 100 of forming a silicon carbide structure by spark plasma sintering, in accordance with embodiments of the disclosure is shown. The method 100 may include act 102, including introducing a powder including silicon carbide into a die of a spark plasma sintering tool; act 104 including exposing the powder to a pressure; act 106 including exposing the powder to a pulsed current density sufficient to heat the powder to a peak temperature while exposing the powder to the pressure; act 108 including exposing the powder to the peak temperature for a predetermined period of time sufficient to form intergranular bonds between the particles of the powder and form a sintered silicon carbide structure; act 110 including cooling the die and the sintered silicon carbide structure; act 112 including optionally reheating the die and sintered silicon carbide structure to a peak temperature; act 114 including cooling the sintered silicon carbide structure and the die to an intermediate temperature; act 116 including repeating acts 112 and 114 of reheating the die and the sintered silicon carbide structure to a peak temperature and cooling the sintered silicon carbide structure and the die; act 118 including removing the sintered silicon carbide structure from the die; and act 120 including minor machining of the sintered silicon carbide structure to a desired size and desired shape.

Act 102 includes introducing a powder including silicon carbide into a die of a spark plasma sintering tool. The silicon carbide powder may include silicon carbide powders sold under the tradename Sinter-Pur® and commercially available from Superior Graphite (e.g., 490N, 490NS) of Chicago, Ill. The silicon carbide powder may include alpha-phase silicon carbide, which may comprise a hexagonal structure and exhibit a higher hardness than beta-phase silicon carbide. The silicon carbide powder may include one or more sintering aids such as, for example, boron carbide ($B_4C$) and carbon sintering aids.

Silicon carbide may constitute between about 98 weight percent and about 100 weight percent of the powder, such as between about 99.0 weight percent and about 99.9 weight percent of the powder. The sintering aid may constitute between about 0.1 weight percent and about 2.0 weight percent of the powder, such as between about 0.1 weight percent and about 1.0 weight percent of the powder. In some embodiments, the silicon carbide constitutes about 99.8 weight percent of the powder and the sintering aid constitutes about 0.2 weight percent of the powder. In some embodiments, the powder may comprise or consist essentially of silicon carbide.

The powder may comprise silicon carbide particles having a spherical, cylindrical, platelet, or other shape. In some embodiments, the powder comprises particles having a spherical shape. In some such embodiments, the powder may have a mean particle size between about 10 nm and about 200 nm, such as between about 10 nm and about 50 nm, between about 50 nm and about 100 nm, or between about 100 nm and about 200 nm.

Figure 2A:
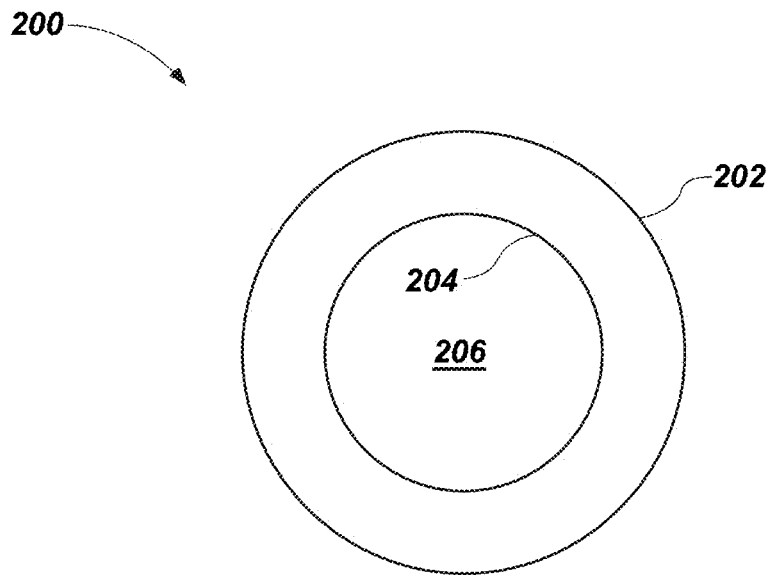
FIG. 2A and FIG. 2B are a cross-sectional top view and a cross-sectional side view of a die of a spark plasma sintering tool, in accordance with embodiments of the disclosure.
Figure 2B:
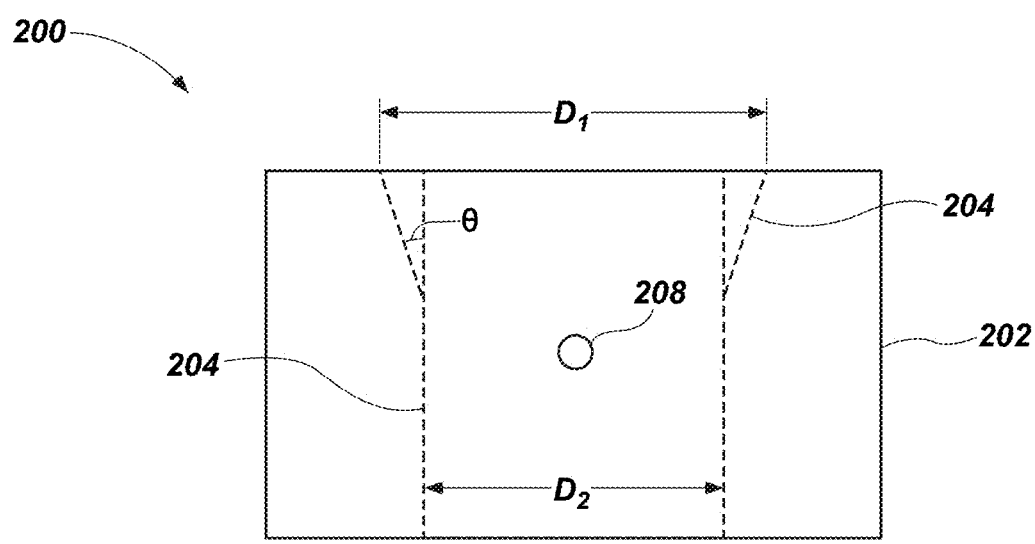

The powder may be loaded into a die shaped and configured to facilitate formation of a sintered structure having a desired shape and size. FIG. 2A and FIG. 2B are a cross-sectional top view and a cross-sectional side view, respectively, of a die 200 that may be used to form the sintered structure. The die 200 may comprise an outer wall 202 and an inner wall 204. The inner wall 204 of the die 200 may define an internal area 206 defining a shape of an article or structure to be sintered. Accordingly, the internal area 206 may correspond to a size and shape of a sintered silicon carbide structure to be formed by the spark plasma sintering process.

Although FIG. 2A illustrates the die 200 as having a circular cross-sectional shape, the disclosure is not so limited. In some embodiments, a cross-sectional shape of the die 200 may have be triangular, square, rectangular, hexagonal, other polygonal, or other cross-sectional shape. In some embodiments, a cross-sectional shape of the die is hexagonal.

Referring to FIG. 2B, the die 200 may include a hole 208 sized and shaped to receive a thermocouple. In some embodiments, the die 200 may include at least another hole 208 configured to receive a push rod to facilitate removal of the sintered silicon carbide structure from the die 200 after formation of the sintered silicon carbide structure.

At least a portion of the inner wall 204 may be tapered or angled, as indicated by angle θ. Angle θ may be between about 0.5° and about 5°. In some embodiments, θ is equal to about 1°. Accordingly, in some embodiments, an internal diameter of the die 200 may have a first dimension (i.e., $D_1$) at a first side (e.g., a top side) and a second dimension (i.e., $D_2$) at a second side (e.g., a bottom side) thereof. In some embodiments, $D_1$ may be greater than $D_2$. In some embodiments, the taper may extend from a first end of the die 200 to a longitudinally central portion of the die 200. In some embodiments, the taper extends from the first end to a location proximate the hole 208. In some such embodiments, about one-half a length of the die 200 may include the taper. However, the disclosure is not so limited and a larger portion or a smaller portion of the die 200 may be tapered.

The die 200 may comprise a material formulated and configured to exhibit a lower electrical resistivity than die materials used in conventional spark plasma sintering tools. The lower electrical resistivity of the die 200 may facilitate less preferential heating of the die materials and punches and increase a ratio of heat generation in the powder to the punches. In some embodiments, the die 200 and the punches of the spark plasma sintering tool comprise graphite comprising a fine isotropic grain structure. In some embodiments, the die 200 may comprise a smaller grain size than a die used in a conventional sintering process. The grain size of the die 200 may be less than 3 μm with a bulk density equal to or greater than about 1.88 g/cm³. A die 200 including such properties may exhibit an electrical resistivity of less than about 13 μΩ/m. The die 200 comprising the isotropic graphite material may facilitate substantially uniform heating of the powder across a cross-section thereof to form a sintered silicon carbide structure with a substantially uniform density.

The pore size of the graphite material may be selected such that the die 200 exhibits a desired coefficient of thermal expansion. In some embodiments, the graphite of the die 200 is selected to have a coefficient of thermal expansion that is approximately equal to or slightly greater than a coefficient of thermal expansion of silicon carbide over a temperature range that the die 200 and the powder are exposed to. By way of nonlimiting example, silicon carbide may exhibit a coefficient of thermal expansion of about 4.0 μm/(m·K) at a temperature between about 1,950° C. and about 2,100° C. The die 200 may be selected to exhibit a coefficient of thermal expansion between about 4.0 μm/(m·K) and about 5.0 μm/(m·K), such as about 4.7 μm/(m·K) at a temperature between about 1,950° C. and about 2,100° C.

Figure 3:
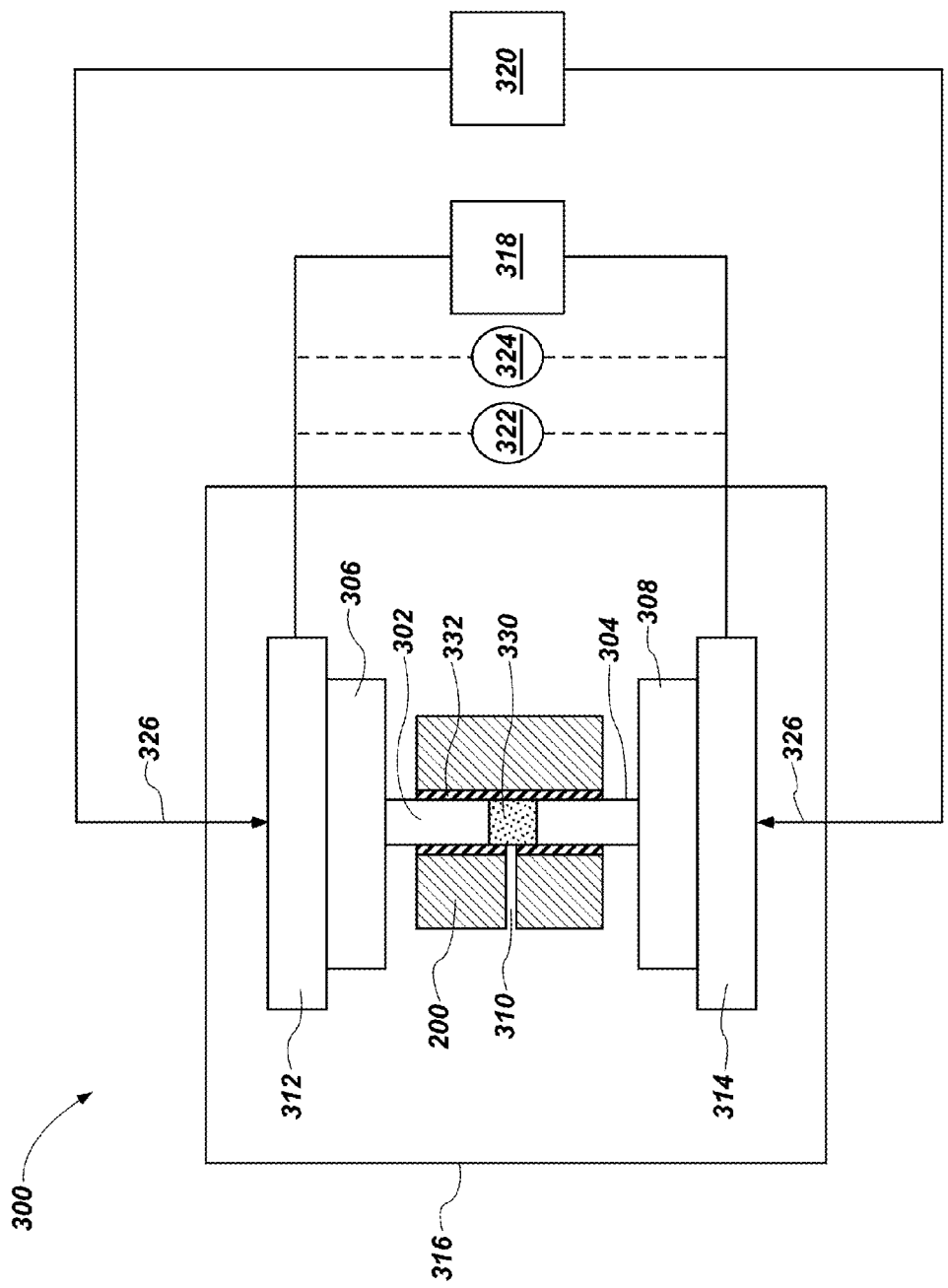
FIG. 3 is a cross-sectional side view of a spark plasma sintering tool, in accordance with embodiments of the disclosure.

FIG. 3 is a cross-sectional side view of a spark plasma sintering tool 300 including the die 200. The spark plasma sintering tool 300 may include an upper punch 302 and a lower punch 304 operably coupled with the die 200. An outer diameter of the upper punch 302 and an outer diameter of the lower punch 304 may be sized and shaped to fit within the inner walls 204 (FIG. 2A, FIG. 2B) of the die 200 (FIG. 2A, FIG. 2B). The die 200, the upper punch 302, and the lower punch 304 may define a volume 330 that may be filled with the powder to be sintered.

In some embodiments, the diameter of each of the upper punch 302 and the lower punch 304 may be about 254 μm (0.010 inch) less than $D_2$ (FIG. 2B). In other embodiments, such as where the die 200 has a cross-sectional shape other than circular, the upper punch 302 and the lower punch 304 may comprise dimensions that are smaller than a corresponding dimension defined by the inner walls 204 of the die 200. In some embodiments, although the inner walls 204 may exhibit a taper, corresponding walls of the upper punch 302 or the lower punch 304 may not exhibit a taper.

The upper punch 302 may be coupled to an upper punch electrode 306 and the lower punch 304 may be coupled to a lower punch electrode 308. In some embodiments, the upper punch electrode 306 and the lower punch electrode 308 may comprise the same material as the upper punch 302 and the lower punch 304. In some embodiments, portions of the die 200, the upper punch 302, and the lower punch 304 are lined with a liner 332 that may include a flexible foil, such as graphite foils sold under the tradename GRAFOIL® by GrafTech International Holdings Inc., of Independence, Ohio. Although not shown, in some embodiments, the liner 332 may be disposed between each of the upper punch 302 and the lower punch 304 and the volume 330.

The upper punch 302 and the lower punch 304 may comprise a graphite material. In some embodiments, the upper punch 302 and the lower punch 304 comprise the same material as the die 200 (FIG. 2A, FIG. 2B). In some such embodiments, the upper punch 302 and the lower punch 304 may comprise isotropic graphite and may have a coefficient of thermal expansion equal to about a coefficient of thermal expansion of silicon carbide at a temperature between about 1,950° C. and about 2,100° C.

A pyrometer 310 may be coupled to the die 200 and configured to measure a temperature within the die 200, such as a temperature of the inner walls 204 (FIG. 2A, FIG. 2B) of the die 200. In some embodiments, the pyrometer 310 may comprise an optical pyrometer. The hole 208 (FIG. 2B) may be configured to receive the pyrometer 310.

In some embodiments, the spark plasma sintering tool 300 may include an upper spacer 312 and a lower spacer 314 as known in the art of spark plasma sintering. The upper spacer 312 and the lower spacer 314 may comprise a same material as the upper punch electrode 306 and the lower punch electrode 308.

In some embodiments, one or more components of the spark plasma sintering tool 300 may be disposed in a vacuum chamber 316. The vacuum chamber 316 may be configured to operate the spark plasma sintering tool 300 under vacuum. In some embodiments, the vacuum chamber 316 comprises a nitrogen atmosphere or an argon atmosphere. The die 200 and one or more of at least a portion of the upper punch electrode 306, at least a portion of the lower punch electrode 308, the upper punch 302, and the lower punch 304 may be disposed within the vacuum chamber 316.

The upper spacer 312 and the lower spacer 314 may be operably coupled to a power source 318, which may comprise, for example, a DC pulse generator or another power source. Electric current from the power source 318 may be provided to the die 200 through the upper spacer 312, the upper punch electrode 306, and the upper punch 302 as well as through the lower spacer 314, the lower punch electrode 308, and the lower punch 304. Responsive to exposure to the electric current, the powder in the die 200 may be heated by Joule heating, as known in the art of spark plasma sintering.

Although FIG. 3 illustrates the upper spacer 312 and the lower spacer 314 operably coupled to the power source 318, the disclosure is not so limited. In other embodiments, the upper punch electrode 306 and the lower punch electrode 308 may be directly coupled to the power source 318. In some such embodiments, the spark plasma sintering tool 300 may not include the upper spacer 312 and the lower spacer 314.

The plasma sintering tool 300 may further include a voltage measurement system 322 and a current measurement system 324 configured to measure a voltage and a current, respectively, applied to powder in the die 200. The voltage measurement system 322 may comprise a voltmeter and the current measurement system 320 may comprise an ammeter.

After the powder is loaded into the volume 330, the powder may be compacted and exposed to a pressure. Act 104 (FIG. 1) includes exposing the powder to a pressure. With continued reference to FIG. 3, a pressurizing system 320 may be operably coupled to the upper spacer 312 and the lower spacer 314. The pressurizing system 320 may be configured to provide a pressure to the powder in the volume 330 during application of the pulsed DC current, as indicated by arrows 326. The pressurizing system 320 may comprise a press, such as, for example, a hydraulic press.

The pressure applied to the powder in the volume 330 may be between about 20 MPa and about 60 MPa, such as about 40 MPa. Use of the die 200 including a taper on at least a portion of the inner walls 204 (FIG. 2A, FIG. 2B) may facilitate application of a pressure of at least about 40 MPa without locking the upper punch 302 in the space defined by the volume 330 when the die 200 and the powder are heated.

With reference again to FIG. 1, act 106 includes exposing the powder in the die 200 to a pulsed current density while exposing the powder to the pressure. In some embodiments, the current density is applied as a direct current. A current and a current density provided to the powder may be controlled by the power source 318. Responsive to exposure to the current density, the powder may be heated by Joule heating (i.e., ohmic heating, resistive heating).

The current density may be selected to provide a desired degree of heating to the powder and at a desired rate. Responsive to exposure to the current density, the powder may be heated at a rate between about 50° C./min and about 200° C./min, such as between about 50° C./min and about 100° C./min or between about 100° C./min and about 200° C./min. In some embodiments, the powder is heated at a rate of about 100° C./min.

The current density and an exposure time of the powder to the current density may be selected to be a predetermined value such that the powder is sintered without degrading the silicon carbide into elemental silicon and elemental carbon, or forming beta-phase silicon carbide. The current density may be between about 0.02 A/mm² and about 0.1 A/mm², based on a cross-sectional area of the volume 300 in which the powder is filled (i.e., an area of the internal area 206 (FIG. 2A)). In some embodiments, while the powder is heated to a peak temperature, the powder may be exposed to a current density of about 0.1 A/mm².

The power source 318 may be configured to provide a voltage between about 0 V and about 10 V. In some embodiments, the voltage may be selected based on one or both of a size of the die 200 or a composition of the powder. The power source 318 may be configured to provide a current sufficient to provide the desired current density, based on a desired amount of Joule heating and a size of the spark plasma sintering tool 300 (i.e., an area of the internal area 206 (FIG. 2A)).

The power source 318 may be configured to provide the current density in pulses. A pulse duration may be about 12/6, meaning that the current may be applied in cycles, each cycle comprising applying a current to the powder for about 12 milliseconds followed by about 6 milliseconds during which no current is applied to the powder. However, the disclosure is not so limited and the pulse duration may comprise different durations.

The powder may be heated to a peak temperature to facilitate formation of intergranular bonds between particles of the powder. Act 108 includes exposing the powder to the peak temperature for a predetermined period amount of time to form a sintered silicon carbide structure. In some embodiments, the powder is exposed to the peak temperature for between about 30 seconds and about 5 minutes, such as between about 30 seconds and about 1 minute, between about 1 minute and about 3 minutes, or between about 3 minutes and about 5 minutes. In some embodiments, the powder is exposed to the peak temperature for about 2 minutes.

The peak temperature may be between about 1,950° C. and about 2,150° C., such as between about 2,000° C. and about 2,100° C. In some embodiments, the peak temperature is about 2,100° C. In other embodiments, the peak temperature is about 2,050° C. The peak temperature may be controlled by the current density applied by the power source 318.

The powder may be exposed to a second current density while the powder is exposed to the peak temperature that is lower than a first current density to which the powder is exposed while the powder is heated to the peak temperature. In some embodiments, the second current density is less than about 0.1 A/mm² and may be between about 0.02 A/mm² and about 0.08 A/mm², such as between about 0.04 A/mm² and about 0.06 A/mm². It is believed that a second current less than the first current density may reduce a likelihood of degrading the silicon carbide into elemental silicon and elemental carbon.

Without wishing to be bound by any particular theory, it is believed that exposing the powder to the current density for the predetermined period of time may form a substantially pure sintered silicon carbide structure without substantially decomposing the silicon carbide powder into elemental silicon, elemental carbon, or both. A current density to which the silicon carbide powder is exposed may be controlled to facilitate formation of a sintered silicon carbide structure having desired properties (e.g., density, hardness, etc.). In some embodiments, the silicon carbide powder is exposed to the peak temperature for about 2 minutes to form the sintered silicon carbide structure, the sintered silicon carbide structure comprising alpha-phase silicon carbide. Surprisingly, if the silicon carbide powder is exposed to the peak temperature for longer than a predetermined period of time (such as by being exposed to a current density greater than a predetermined value or for longer than a predetermined period of time (such as about 2 minutes)), the sintered silicon carbide structure may include different morphologies (e.g., beta-phase silicon carbide), a decreased theoretical density, a decreased hardness, and impurities (e.g., elemental carbon, elemental silicon, etc.).

In addition, the sintered silicon carbide structure may exhibit a reduced amount of coarsening responsive to exposure to a current density greater than a predetermined value. Stated another way, the sintered silicon carbide structure may exhibit more coarsening and desired properties responsive to being exposed to a peak temperature for a shorter duration than when exposed to the peak temperature for an excessive duration. Without wishing to be bound by any particular theory, it is believed that the current density to which the powder is exposed facilitates a substantially uniform temperature profile across a cross-section of the volume 330, reducing an amount of elemental silicon and carbon, or variations in one or more properties across a cross-section of the sintered silicon carbide structure and forms a substantially homogeneous microstructure having substantially uniform properties. Accordingly, the current density, the peak temperature, and the total current density to which the silicon carbide material is exposed may be controlled to facilitate formation of a sintered silicon carbide material exhibiting a desired purity, hardness, and density.

Act 110 includes cooling the die 200 and the sintered silicon carbide structure from the peak temperature to a lower, intermediate temperature. The sintered silicon carbide structure may be cooled at a rate between about 100° C./min and about 500° C./min, such as between about 100° C./min and about 300° C./min, or between about 300° C./min and about 500° C./min. In some embodiments, the sintered silicon carbide structure is cooled to a temperature of about 600° C. In other embodiments, the sintered silicon carbide structure is cooled to about room temperature (e.g., about 25° C.).

After the sintered silicon carbide structure has cooled to the intermediate temperature, the sintered silicon carbide structure may be exposed to one or more duty cycles to further densify the sintered silicon carbide structure. As used herein, the term "duty cycle" means and includes heating a material (e.g., the sintered silicon carbide structure) to a peak temperature for a predetermined duration and cooling the material to an intermediate temperature lower than the peak temperature. The peak temperature may be between about 1,950° C. and about 2,150° C., such as between about 2,000° C. and about 2,100° C. In some embodiments, the peak temperature is about 2,100° C. The predetermined duration may be between about 30 seconds and about 5 minutes, such as about 2 minutes.

Act 112 includes optionally reheating the die 200 and the sintered silicon carbide structure. The power source 318 may be configured to supply a current density to the sintered silicon carbide structure to expose the sintered silicon carbide structure to a peak temperature. In some embodiments, the sintered silicon carbide structure is exposed to a temperature equal to about a peak temperature to which the powder was exposed in act 108.

After being exposed to the peak temperature, the sintered silicon carbide structure may be cooled. Act 114 includes cooling the die 200 and the sintered silicon carbide structure to the intermediate temperature. The intermediate temperature may be held for a predetermined amount of time, such as between about 1 minute and about 5 minutes. After the die 200 and the sintered silicon carbide structure are cooled, the sintered silicon carbide structure may be reheated and exposed to the peak temperature in another duty cycle, as indicated by arrow 116.

In some embodiments, a density of the sintered silicon carbide structure may increase by about 0.1 g/cm$^3$ for each duty cycle to which the sintered silicon carbide structure is exposed. In some embodiments, the sintered silicon carbide structure is exposed to two duty cycles and the density is increased by about 0.2 g/cm$^3$.

Act 118 may include removing the sintered silicon carbide structure from the die 200. Conventionally, spark plasma sintering tools may be sized and shaped with a significant clearance between the punches and the corresponding die. Stated another way, the punches may be significantly oversized to reduce a difficulty of removing the punches from the die after forming a sintered structure. When sufficient clearance between the punch and the die walls is not provided, the sintered structure may crack under the pressure caused by the lack of clearance.

Without wishing to be bound by any particular theory, it is believed that forming the die 200 with the taper as described herein and forming the die 200 from a material exhibiting a coefficient of thermal expansion closely matching a coefficient of thermal expansion of the sintered silicon carbide structure, may substantially reduce a likelihood of the upper punch 302 or the lower punch 304 being stuck within the die 200 during the spark plasma sintering process. Since the coefficient of thermal expansion of the die 200 may be selected to be equal to or slightly greater than a coefficient of thermal expansion of silicon carbide, the upper punch 302 and the lower punch 304 may move freely in the die 200 at the operating temperatures of the spark plasma sintering tool 300.

Accordingly, the upper punch 302 and the lower punch 304 may be removed from the die 200 and the sintered silicon carbide structure may be removed therefrom without cracking or damaging the sintered silicon carbide structure. In addition, the sintered silicon carbide structure may be formed without excessive lubrication and, in some embodiments, may be formed without lubrication.

Act 120 may include minor machining of the sintered silicon carbide structure to form a final structure. In some embodiments, act 120 may include modifying at least one or more dimensions of the sintered silicon carbide structure to form a machined structure exhibiting a desired shape and a desired size. As one nonlimiting example, peripheral portions of the structure may be removed (e.g., ground, etched, etc.) to provide a machined structure exhibiting a diameter and a height suitable for a desired application (e.g., a desired LWR application). As another example, in some embodiments, a taper in the sintered silicon carbide structure corresponding to the taper of the inner walls 204 (FIG. 2A, FIG. 2B) may be removed from the sintered silicon carbide structure.

By way of nonlimiting example, the machining process may include subjecting the sintered silicon carbide structure to a centerless grinding process to form the machined structure exhibiting a desired diameter and a desired height. In some embodiments, the centerless grinding process includes inserting the sintered silicon carbide structure onto a guide and exposing a portion of a peripheral sidewall of the structure, moving and rotating (e.g., spinning) the structure along the guide using a feed wheel, and removing a portion of the peripheral sidewall using a grinding wheel (e.g., a diamond resin grinding wheel) operatively associated with the guide. The grinding wheel may remove (e.g., grind) a portion of the peripheral sidewall of the structure during each pass of the structure across the grinding wheel. The amount of the final structure removed by the grinding wheel during each pass may be controlled to achieve the desired diameter of the machined structure. The removal (e.g., grinding) rate of the grinding wheel in terms of a depth of material removed during each pass of the grinding wheel may be substantially constant, or may be varied. The removal rate of the grinding wheel may, for example, be decreased as the desired diameter of the machined structure is approached. After removal of any materials desired to be removed from the structure, the structure may be formed to a desired size and a desired shape.

The sintered silicon carbide structure formed according to embodiments described herein may exhibit a density of about 100% a theoretical density of alpha-phase silicon carbide. In some embodiments, the sintered silicon carbide structure exhibits a density of about 3.21 g/cm$^3$, or about 100% theoretical density. The sintered silicon carbide structure may exhibit a density of at least about 98% the theoretical density (i.e., about 3.146 g/cm$^3$), at least about 99% the theoretical density (about 3.178 g/cm$^3$), or about 100% of the theoretical density.

The sintered silicon carbide structure may exhibit a higher hardness compared to silicon carbide structures formed by conventional methods. In some embodiments, the sintered silicon carbide structure may exhibit a hardness of about 3394 HV 0.2 (i.e., a hardness value of about 3394 at an applied load of 0.2 kgf) as determined by the Vickers indentation method. The hardness value may be between about 3000 HV and about 3400 HV at an applied load between about 0.2 kgf and about 1.0 kgf. Table 1 below shows hardness data of sintered silicon carbide structures formed according to the methods described herein.

TABLE 1

| Sample Number | Load kgf | Hardness (HV) | Hardness (GPa) |
|---|---|---|---|
| 1 | 0.2 | 3394 | 33.30 |
| 2 | 0.3 | 3266 | 32.04 |
| 3 | 0.5 | 3255 | 31.93 |
| 4 | 1.0 | 3029 | 29.71 |

Figure 6A:
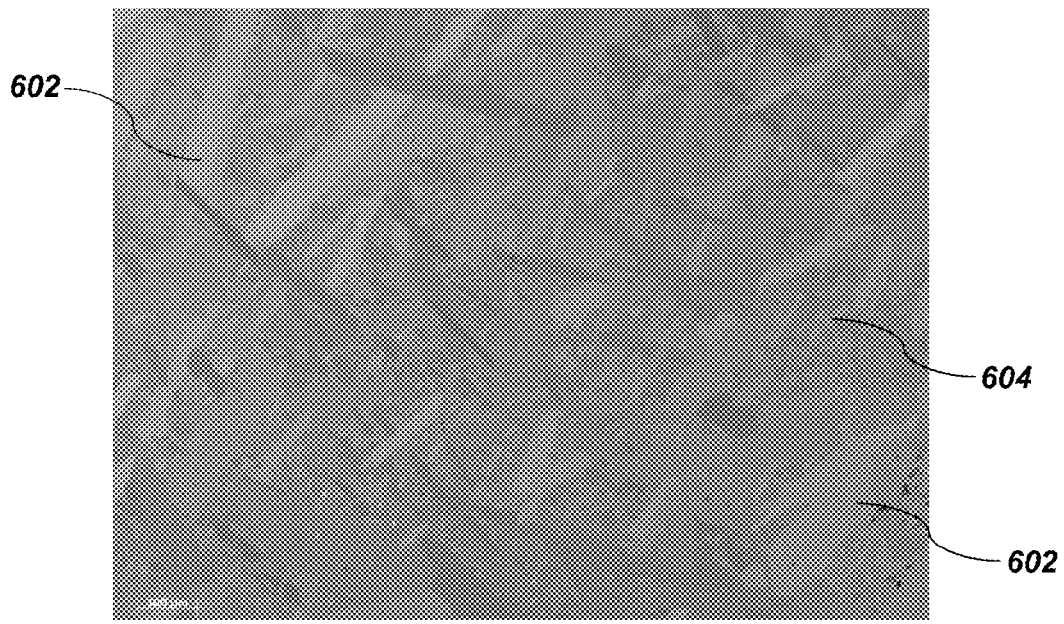
FIG. 6A through FIG. 6C are micrograph images of a sintered silicon carbide structure formed according to embodiments of the disclosure.
Figure 6B:
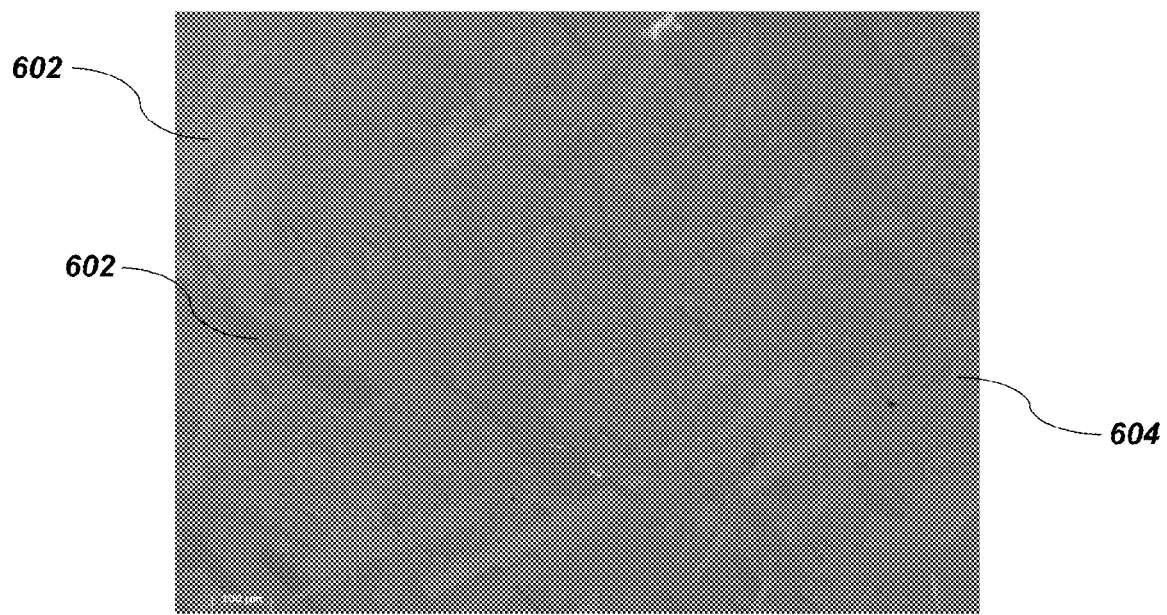
Figure 6C:
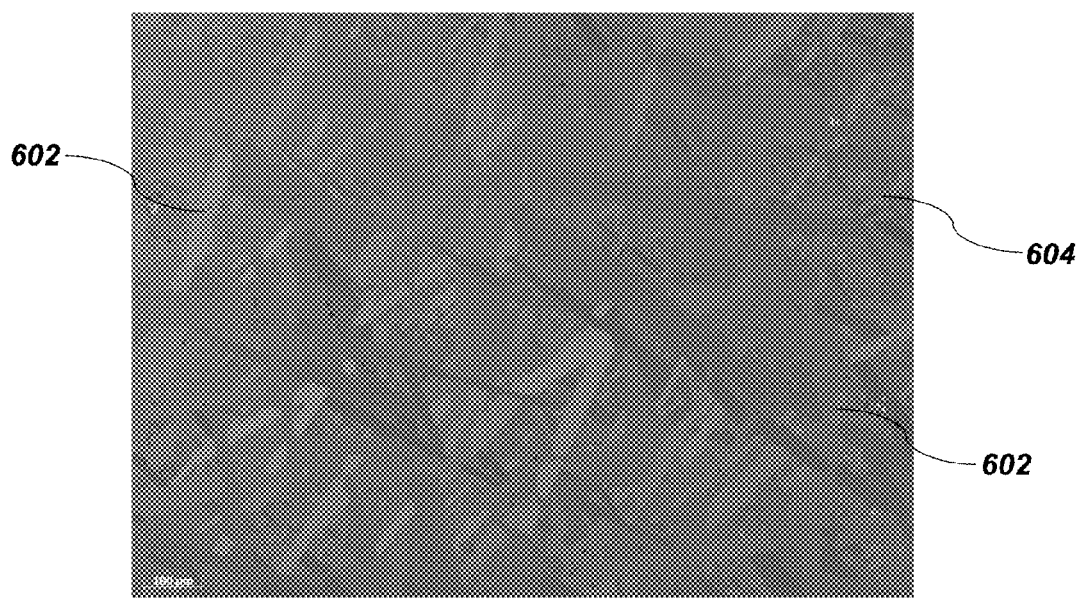

FIG. 6A through FIG. 6C are micrograph images of a sintered silicon carbide structure formed according to the methods described herein. The sintered silicon carbide structure comprised a plate having a thickness of about 6.35 mm (about 0.250 inch). FIG. 6A is an SEM of a top portion of the plate, FIG. 6B is an SEM of a middle portion of the plate, and FIG. 6C is an SEM of a bottom portion of the plate. The sintered silicon carbide structure included a plurality of elongated grains 602 and a plurality of relatively smaller grains 604 of silicon carbide. The elongated grains 602 and the relatively smaller grains 604 comprise alpha-phase silicon carbide. The elongated grains 602 had a width between about 10 μm and about 100 μm and a length between about 100 μm and about 500 μm. The elongated grains 602 exhibited an aspect ratio between about 10:1 and about 17:1. The plurality of relatively smaller grains 604 had a width between about less than about 1 μm and about 10 μm and a length between about less than about 5 μm and about 100 μm. The top portion (FIG. 6A), the middle portion (FIG. 6B), and the lower portion (FIG. 6C) of the plate exhibited substantially the same composition of elongated grains 602 and relatively smaller grains 604 indicating a substantially uniform temperature profile across the plate during the spark plasms sintering thereof.

The sintered silicon carbide structures formed according to the methods described herein may comprise an integral silicon carbide structure having a larger size than silicon carbide structures formed by other methods. In some embodiments, the sintered silicon carbide structure may have a diameter of about 40 mm. In other embodiments, the sintered silicon carbide structure may have a diameter of about 76.2 mm (about 3.0 inches) and a thickness of about 6.35 mm.

In some embodiments, the sintered silicon carbide structure may exhibit a thickness to diameter ratio greater than about 1:2. By way of contrast, silicon carbide structures formed by methods such as liquid phase sintering, hot axial pressing, or other methods, may not form sintered silicon carbide structures exhibiting substantially uniform properties across a thickness thereof when the diameter to thickness ratio is greater than about 1:2.

Silicon carbide materials formed by the methods described herein may form a part of armor or an armored system, such as in military armor suits, armored vehicles, or other structures. In some embodiments, the sintered silicon carbide materials may comprise at least a part of body armor for the military. Accordingly, in some embodiments, the sintered silicon carbide structures may be shaped and configured to conform to military personnel suited with armor comprising the sintered silicon carbide structures. In other embodiments, the silicon carbide materials may be used in high powered semiconductor materials, such as in solid-state switches (e.g., solid-state relays), in nuclear applications, such as in fuel cladding, as a fuel assembly cover, or as a component of a control rod in nuclear reactors.

EXAMPLES

Example 1

Figure 4:
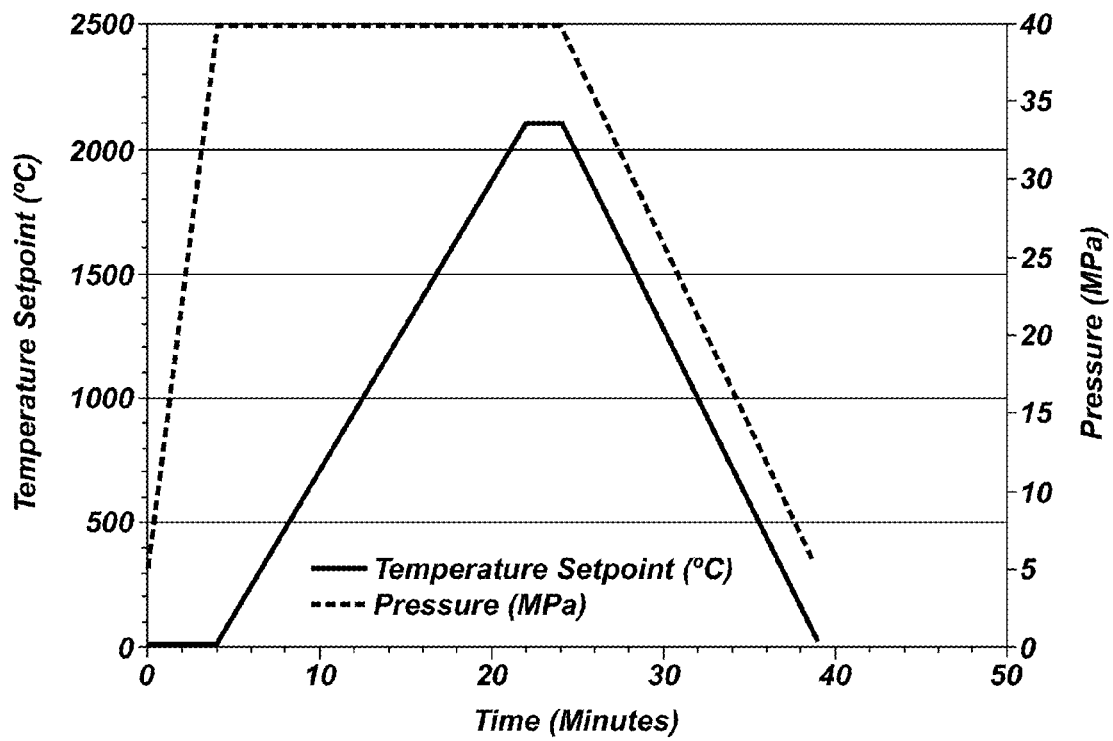
FIG. 4 is a sintering profile showing a temperature and a pressure during spark plasma sintering of silicon carbide powder according to a sintering schedule.

FIG. 4 is a sintering profile showing a temperature and a pressure during spark plasma sintering of silicon carbide powder. As illustrated, the silicon carbide powder was exposed to a pressure of about 40 MPa. The temperature of the silicon carbide powder was increased from room temperature to a peak temperature of about 2,100° C. in about 18 minutes (from about minute 4 to about minute 22 in the graph). The powder was exposed to the peak temperature for about 2 minutes and then allowed to cool. During cooling, the axial pressure the powder was exposed to was reduced at a substantially linear rate from about 40 MPa to about 5 MPa. The sintered silicon carbide structure exhibited a theoretical density of about 98%.

Example 2

Figure 5:
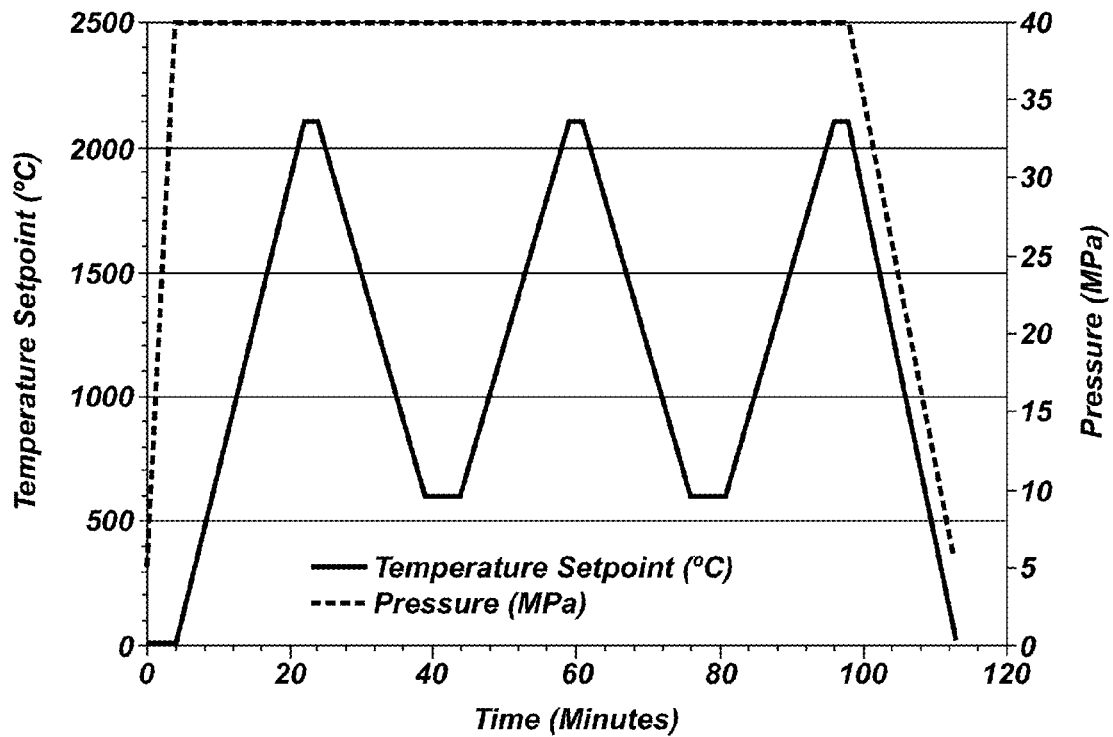
FIG. 5 is a sintering profile showing a temperature and a pressure during spark plasma sintering of silicon carbide powder according to another sintering schedule.

FIG. 5 is a sintering profile showing a temperature and a pressure during the spark plasma sintering of silicon carbide powder. The silicon carbide powder was exposed to a peak temperature of about 2,100° C. for about 2 minutes and subsequently allowed to cool to about 600° C. The silicon carbide was exposed to another temperature cycle wherein the temperature was ramped from about 600° C. to the peak temperature (about 2,100° C.) and the peak temperature was held for about 2 minutes. After the powder cooled to about 600° C., the powder was heated to the peak temperature and the peak temperature was held for about 2 minutes. Thereafter, the powder was allowed to cool. During the cycles of heating and cooling, the powder was exposed to a pressure of about 40 MPa. The sintered silicon carbide structure exhibited a theoretical density greater than about 99% and equal to approximate full theoretical density. Without wishing to be bound by any particular theory, it is believed that cycling the powder during sintering relieves internal stresses that may otherwise bind the sintered structure to the die and would prevent full compaction during sintering.

While embodiments of the disclosure may be susceptible to various modifications and alternative forms, specific embodiments have been shown by way of example in the drawings and have been described in detail herein. However, it should be understood that the disclosure is not limited to the particular forms disclosed. Rather, the disclosure encompasses all modifications, variations, combinations, and alternatives falling within the scope of the disclosure as defined by the following appended claims and their legal equivalents.

What is claimed is:

1. A method of forming silicon carbide by spark plasma sintering, the method comprising:
    loading a powder comprising silicon carbide into a die;
    exposing the powder to a current to heat the powder at a rate of between about 50° C./min and about 200° C./min to a peak temperature while applying a pressure to the powder;
    while the powder is exposed to the peak temperature, exposing the powder to a current density less than about 0.1 A/mm$^2$ for between about 30 seconds and about 5 minutes to form a sintered silicon carbide structure; and
    cooling the sintered silicon carbide structure.

2. The method of claim 1, further comprising, after cooling the sintered carbide structure, exposing the sintered silicon carbide structure to the peak temperature again to increase a density of the sintered silicon carbide structure.

3. The method of claim 1, further comprising selecting the powder to comprise silicon carbide and a sintering aid.

4. The method of claim 3, further comprising selecting the sintering aid to comprise boron carbide.

5. The method of claim 1, further comprising selecting the powder such that silicon carbide constitutes at least about 98 weight percent of the powder.

6. The method of claim 1, wherein cooling the sintered silicon carbide structure comprises cooling the sintered silicon carbide structure at a rate between about 100° C./min and about 500° C./min.

7. The method of claim 1, further comprising selecting the peak temperature to be between about 2,000° C. and about 2,100° C.

8. The method of claim 1, further comprising exposing the powder to the peak temperature for about 2 minutes.

9. The method of claim 1, wherein forming a sintered silicon carbide structure comprises forming the sintered silicon carbide structure to have a density of at least about 3.178 g/cm$^3$.

10. The method of claim 1, wherein exposing the powder to a current to heat the powder at a rate of between about 50° C./min and about 200° C./min to a peak temperature comprises exposing the powder to a current density of about 0.1 A/mm$^2$.

11. The method of claim 1, further comprising selecting the die to comprise at least one tapered sidewall.

12. The method of claim 11, further comprising selecting the taper to comprise about a 1° taper.

13. The method of claim 1, further comprising selecting the die to comprise graphite exhibiting a coefficient of thermal expansion equal to about a coefficient of thermal expansion of the sintered silicon carbide structure between a temperature of about 1,950° C. and about 2,100° C.

14. The method of claim 1, wherein forming a sintered silicon carbide structure comprises forming a silicon carbide structure having a density of about 3.21 g/cm$^3$.

15. The method of claim 1, wherein providing a silicon carbide powder into the die comprises providing the silicon carbide powder into the die substantially free of a lubricant.

16. The method of claim 1, further comprising selecting the die to comprise isotropic graphite.

17. The method of claim 1, wherein exposing the powder to a current comprises pulsing a direct current through the powder in cycles, each cycle comprising pulsing the direct current for about 12 milliseconds followed by applying substantially no current for about 6 milliseconds.

18. The method of claim 1, further comprising, after cooling the sintered carbide structure, exposing the sintered silicon carbide structure to the peak temperature again to increase a density of the sintered silicon carbide structure by at least about 0.1 g/cm$^3$.

* * * * *